United States Patent
Kohtoku et al.

(10) Patent No.: US 8,354,014 B2
(45) Date of Patent: Jan. 15, 2013

(54) PALLADIUM COMPLEX AND CATALYST-IMPARTING TREATMENT SOLUTION USING THE SAME

(75) Inventors: Makoto Kohtoku, Kawasaki (JP); Mika Hamada, Kawasaki (JP)

(73) Assignee: Ebara-Udylite Co., Ltd., Tokyo (JP)

( * ) Notice: Subject to any disclaimer, the term of this patent is extended or adjusted under 35 U.S.C. 154(b) by 738 days.

(21) Appl. No.: 12/096,027

(22) PCT Filed: Nov. 2, 2006

(86) PCT No.: PCT/JP2006/321941
§ 371 (c)(1),
(2), (4) Date: Oct. 7, 2009

(87) PCT Pub. No.: WO2007/066460
PCT Pub. Date: Jun. 14, 2007

(65) Prior Publication Data
US 2010/0047458 A1 Feb. 25, 2010

(30) Foreign Application Priority Data
Dec. 6, 2005 (JP) .................................. 2005-351998

(51) Int. Cl.
C25D 5/56 (2006.01)
C23C 28/02 (2006.01)
C23C 18/20 (2006.01)
C23C 18/28 (2006.01)
C23C 18/30 (2006.01)

(52) U.S. Cl. ........ 205/167; 205/183; 205/184; 205/187; 205/210; 427/304; 427/305; 427/306

(58) Field of Classification Search .................. 427/304; 205/167
See application file for complete search history.

(56) References Cited

U.S. PATENT DOCUMENTS
4,873,136 A * 10/1989 Foust et al. .................. 428/209
(Continued)

FOREIGN PATENT DOCUMENTS
CN 1155230 A 7/1997
(Continued)

OTHER PUBLICATIONS
English language abstract of Japan 02-160606, first published in Japanese Jun. 1990, 1 page.*
(Continued)

Primary Examiner — Katherine A Bareford
(74) Attorney, Agent, or Firm — Oblon, Spivak, McClelland, Maier & Neustadt, L.L.P.

(57) ABSTRACT

There are provided technologies for adsorbing a catalyst metal selectively to an anionic group such as a carboxyl group, thereby forming a metal film on a nonconductive resin selectively, including a palladium complex represented by the following formula (I):

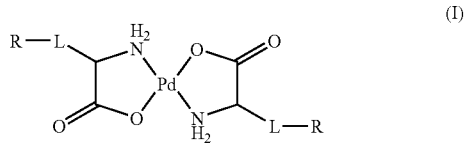

wherein L represents an alkylene group and R represents an amino group or a guanidyl group, or a structural isomer thereof, a processing solution for electroless plating catalyst application containing the complex as an active component, and a method for forming a metal plated film on a nonconductive resin, containing subjecting a nonconductive resin having a surface anionic group to a catalyst adsorbing treatment using the processing solution and then to a reduction treatment, electroless metal plating, and metal electroplating.

16 Claims, 3 Drawing Sheets

U.S. PATENT DOCUMENTS 5,133,840 A * 7/1992 Buchwalter et al. .......... 205/167

FOREIGN PATENT DOCUMENTS

| JP | 60-036672 | * | 2/1985 |
| JP | 01-149971 | | 6/1989 |
| JP | 02-160606 | * | 6/1990 |
| JP | 2 160606 | | 6/1990 |
| JP | 04-365877 | | 12/1992 |
| JP | 06-101054 | | 4/1994 |
| JP | 07-011448 | | 1/1995 |
| JP | 10 504822 | | 5/1998 |
| JP | 10 317155 | | 12/1998 |
| JP | 2001 73159 | | 3/2001 |
| JP | 2005 29735 | | 2/2005 |
| JP | 2007-056343 | | 3/2007 |

OTHER PUBLICATIONS

Yamauchi, et al "Electrostatic Ligand-Ligand Interactions in Ternary Amino Acid-Palladium (II) Complexes. Synthetic Studies and Spectroscopic Evidence", J. Am. Chem. Soc., vol. 103, No. 2, 1981, pp. 391-398.*

Patent Office English Translation of Japan 60-036672, first published in Japanese Feb. 1985, 10 pages.*

Patent Office English Translation of Japan 02-160606, first published in Japanese Jun. 1990, 17 pages.*

Office Action issued Nov. 24, 2011 in Chinese Patent Application No. 201010602612.X (with English translation).

* cited by examiner

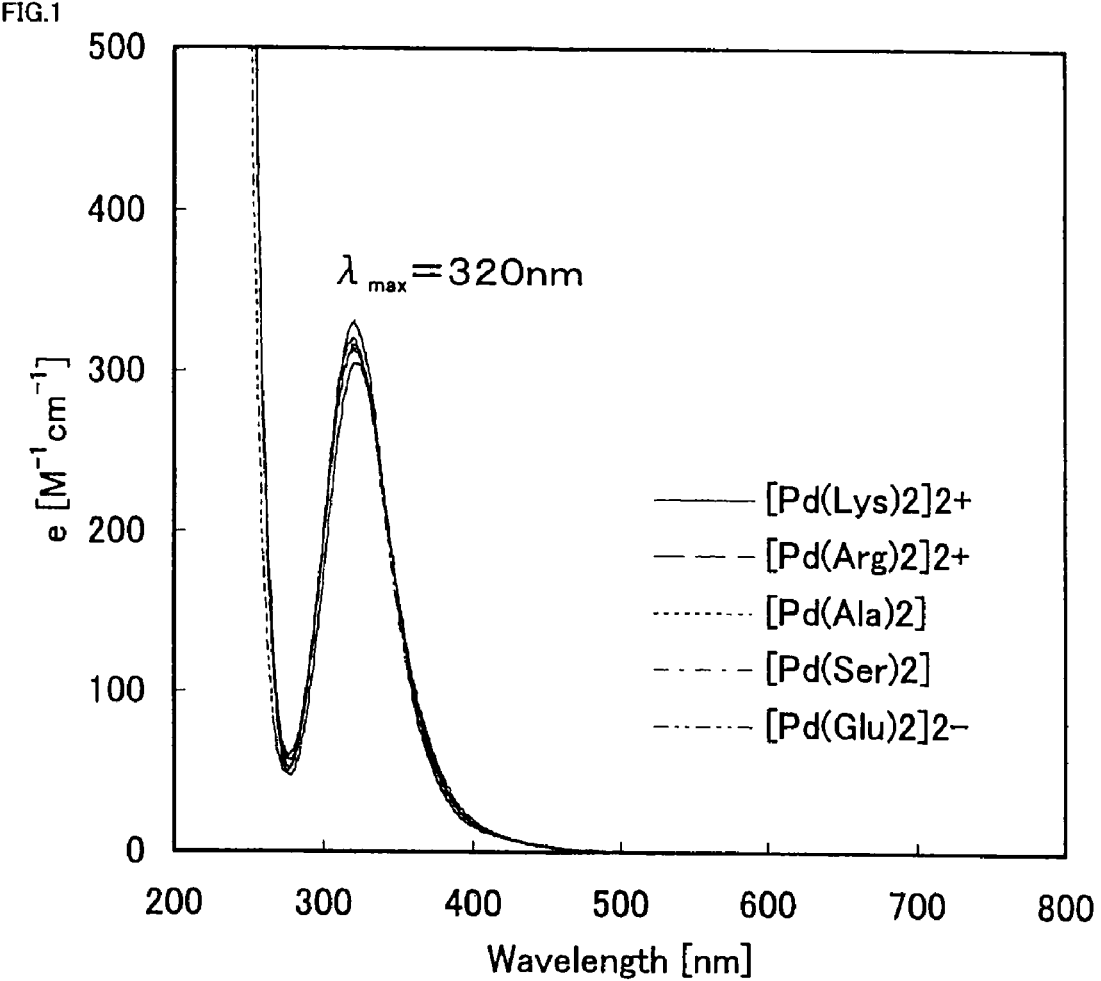

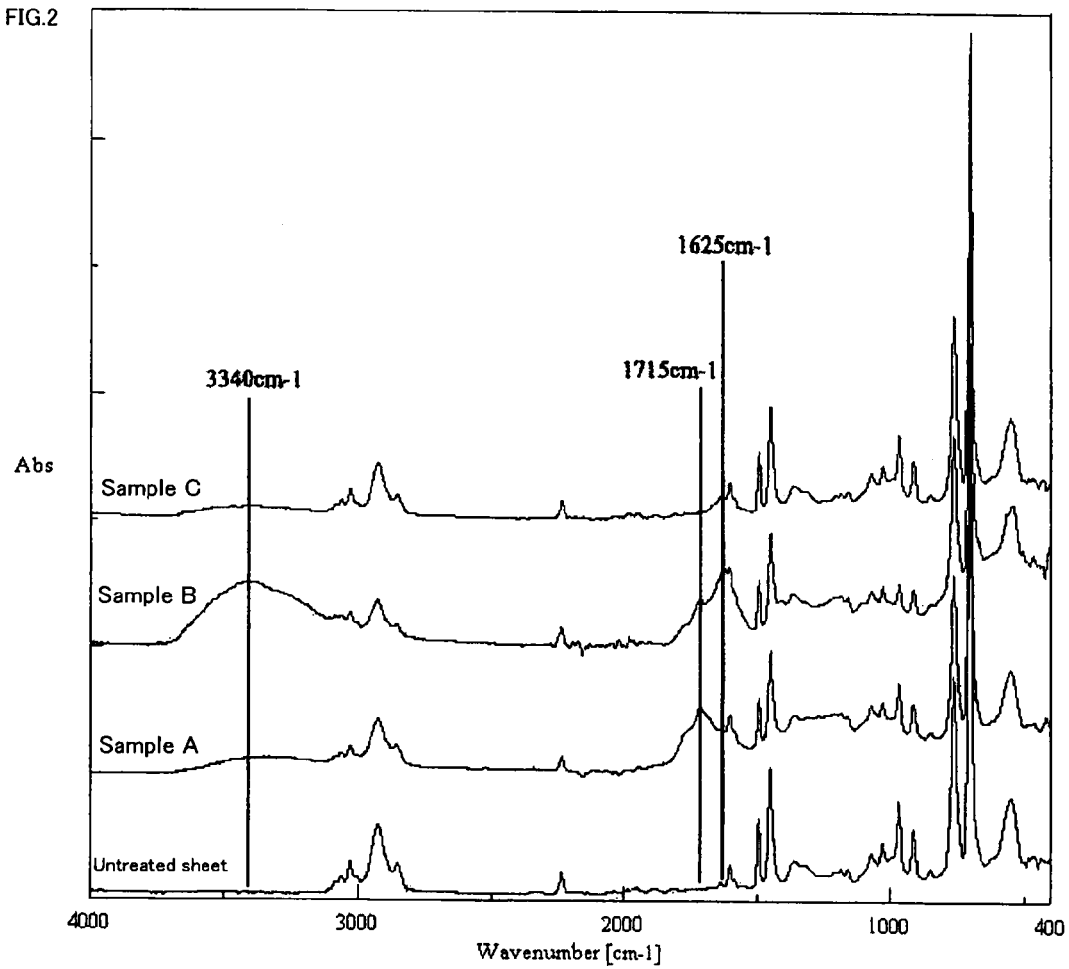

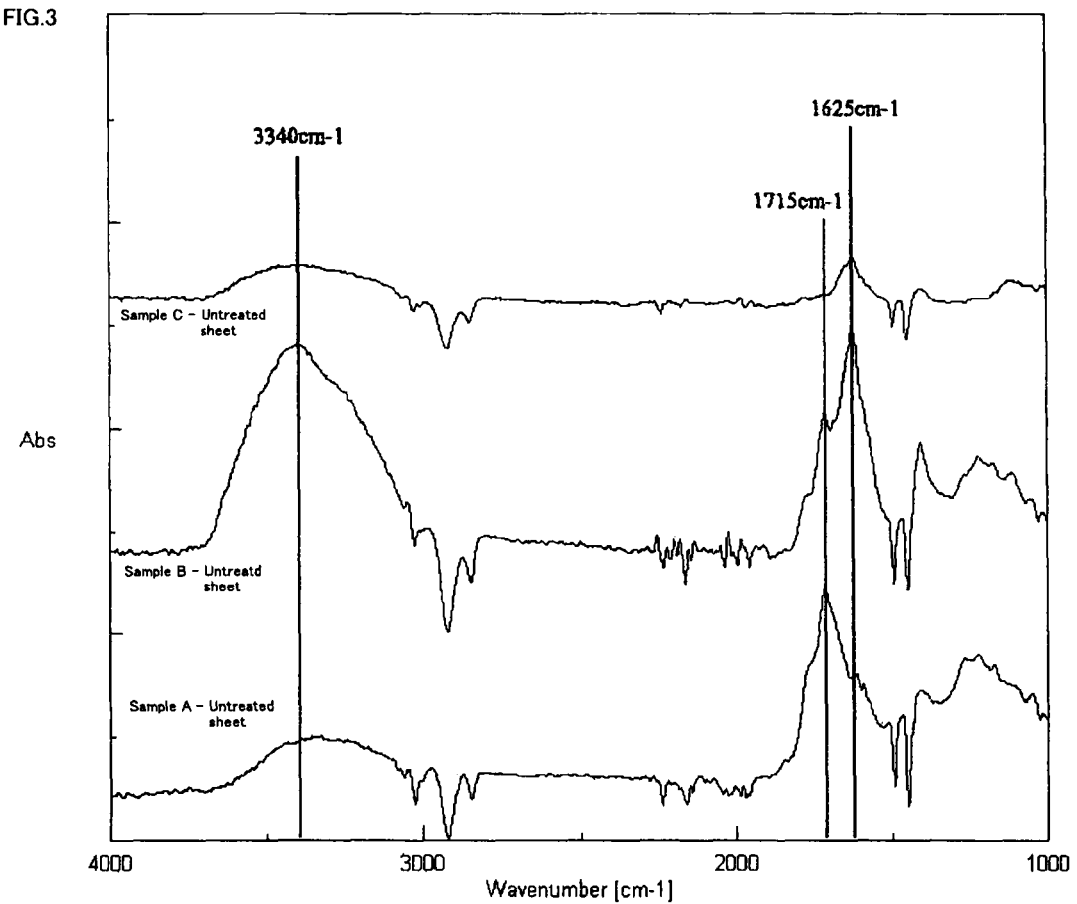

PALLADIUM COMPLEX AND CATALYST-IMPARTING TREATMENT SOLUTION USING THE SAME

CROSS REFERENCE TO RELATED APPLICATION

This application is a 371 of PCT/JP06/321941, filed on Nov. 2, 2006, and claims priority to Japanese Patent Application No. 2005-351998, filed on Dec. 6, 2005.

TECHNICAL FIELD

The present invention relates to a palladium complex and a processing solution for catalyst application using the complex, and particularly to a palladium complex derived from a basic amino acid and palladium, and a processing solution for catalyst application using the palladium complex, capable of selectively adsorbing palladium onto a surface of a nonconductive resin having a carboxyl group.

BACKGROUND ART

Recently there have been demands for improving wiring densities and performances of printed circuit boards with miniaturization and performance enhancement of electronics devices. Polyimide resins are excellent in properties such as heat resistance, electrical insulation property, mechanical strength, and flexibility, and thereby have been practically used in base films for flexible printed boards and TAP tapes. Generally the polyimide resins have been widely used such that films thereof are covered with copper to form copper-clad polyimide substrates.

Known methods for producing the copper-clad polyimide substrates include laminating methods, casting methods, and sputtering/plating methods. In the laminating methods, a polyimide film is attached to a copper foil by using an adhesive, and in the casting methods, a polyimide precursor of a polyamic acid is applied to a roughened copper foil surface and heated. Though these methods are advantageously excellent in productivity and adhesion between a copper foil and polyimide, the interface between the copper foil and polyimide is largely rough and it is difficult to reduce the copper foil thickness, so that the methods are disadvantageously unsuitable for fine patterning.

In contrast, the sputtering/plating methods are such that a conductive layer is formed on a polyimide film surface by sputtering and a copper layer is thickened by electroplating. Thus, the interface between the copper layer and the polyimide is flat, and the thickness of the copper layer can be controlled in the electroplating, whereby the methods are suitable for fine patterning.

However, an expensive sputtering apparatus is needed in the sputtering/plating methods, resulting in increased costs of the copper-clad polyimide substrate and low productivity. Therefore, attempt to form a conductive layer by electroless plating in stead of sputtering, thereby further reducing the costs and increasing the productivity, has been made.

Meanwhile a process of soaking a polyimide resin in an aqueous solution of an alkaline metal hydroxide has been known as a method for achieving electroless plating on the polyimide resin with excellent adhesion. The electroless plating adhesion is improved by using the process of soaking the polyimide resin in the aqueous alkaline metal hydroxide solution because, when the polyimide comes into contact with the solution, imide rings of the polyimide are alkali-hydrolyzed and opened to form polar groups, and as a result the chemical bonding to a metal film is increased. Further, it is presumed that the polyimide surface is etched and made rough by the aqueous alkaline metal hydroxide solution, whereby the contact area between the surface and the metal film is increased, and the adhesion is improved by the anchor effect.

Recently reported are a method described in Patent Document 1 containing the steps of treating a polyimide resin with an aqueous potassium hydroxide solution to open an imide ring, thereby generating a carboxyl group, coordinating a palladium or copper ion to the carboxyl group, applying a reducing agent to the resin, irradiating the resultant with ultraviolet ray through a photomask to reduce the palladium or copper ion in the irradiated region, thereby forming a catalyst metal core, and depositing an electroless plating layer to form a circuit pattern, and a method described in Patent Document 2 containing the steps of applying an alkaline alcohol aqueous solution by an ink-jet process to form a pattern, and adsorbing a catalyst metal only to a portion coated with the solution to deposit an electroless plating layer.

It is believed that, instead of conventional subtractive methods of etching the copper layer in regions unnecessary for forming circuits in a copper-clad polyimide substrate to form insulating portions, the fully additive methods of depositing a metal only in regions necessary for forming circuits will be used more widely with increase of wiring density and improvement of performance of printed circuit boards.

However, the above methods are disadvantageous in that palladium chloride, etc., which are widely used as catalyst metals for electroless plating, have poor adsorption selectivity and are adsorbed also to portions other than carboxyl groups. Thus, in view of responding the high wiring density expected to further increase in future, a technology for adsorbing a catalyst metal selectively to an anionic group such as a carboxyl group, thereby achieving electroless plating, is demanded.

[Patent Document 1] JP-A-2001-73159
[Patent Document 2] JP-A-2005-29735

DISCLOSURE OF THE INVENTION

Problems that the Invention is to Solve

Accordingly, an object of the present invention is to provide a technology for adsorbing a catalyst metal selectively to an anionic group such as a carboxyl group, thereby forming a metal film selectively on a nonconductive resin.

Means for Solving the Problems

As a result of intense research in view of achieving the above object, the inventors have found that, by using a complex compound of a basic amino acid and palladium as a catalyst metal for electroless plating, a large amount of the catalyst metal can be adsorbed selectively to a material having a surface anionic group such as a carboxyl group, etc. due to chemical interaction between the anionic group and a basic portion of the amino acid, and as a result, an electroless plated film can be selectively deposited. The present invention has been accomplished based on the finding.

Thus, according to the invention, there is provided a palladium complex or a structural isomer thereof, the palladium complex being represented by the following formula (I):

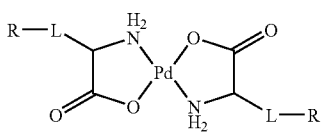

(I)

wherein L represents an alkylene group and R represents an amino group or a guanidyl group.

Further, according to the invention, there is provided a processing solution for electroless plating catalyst application containing the palladium complex or a structural isomer thereof as an active component.

Further, according to the invention, there is provided a method for forming a metal plated film on a surface of a nonconductive resin, containing subjecting a nonconductive resin having a surface anionic group to a catalyst adsorbing treatment and then to a reduction treatment, electroless metal plating, and metal electroplating, characterized in that the above processing solution for electroless plating catalyst application containing the palladium complex or a structural isomer thereof as an active component is used in the catalyst adsorbing treatment.

Advantage of the Invention

The palladium complex of the present invention is adsorbed selectively to an anionic group of a plating subject material, whereby electroless plating can be selectively carried out and a metal film can be selectively formed.

Thus, in the field of electroplating, the palladium complex can be effectively used for forming a circuit by a fully additive method, in which it is necessary to selectively deposit a metal film. Further, in the field of decorative plating, a novel plating process, which does not generate electroless plating deposition on a plating jig, can be accomplished in the invention.

BRIEF DESCRIPTION OF THE DRAWINGS

[FIG. 1] Ultraviolet-visible absorption spectra of palladium-amino acid complexes are shown.

[FIG. 2] Change of FT-IR spectra depending on treatments for oxidizing ABS resin surfaces is shown.

[FIG. 3] Difference spectra of FT-IR spectra shown in FIG. 2 from an untreated resin are shown.

BEST MODE FOR CARRYING OUT THE INVENTION

The typical palladium complex used in the present invention, which is represented by the above formula (I), is such that an amino group and a carboxyl group of each basic amino acid is coordinated to palladium. The palladium complex is a trans isomer represented by the formula (I), and has a structural isomer of a cis isomer represented by the following formula (I'). In the invention, any one of the isomers may be used and a mixture of the isomers may be used.

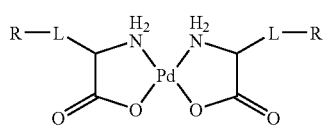

(I')

Among the components forming the palladium complex or the structural isomer thereof (hereinafter referred to as "the palladium complex (I)"), the palladium (Pd) acts as a catalyst metal. A palladium salt such as palladium chloride, palladium sulfate, or palladium nitrate may be used for producing the palladium complex (I).

The basic amino acid may be an amino acid having a cationic group (e.g. an amino group, a guanidyl group), such as lysine, arginine, or ornithine. Examples of the basic amino acids include L-lysine, D-lysine, DL-lysine, L-lysine hydrochloride, D-lysine hydrochloride, DL-lysine hydrochloride, L-lysine hydrobromide, D-lysine hydrobromide, DL-lysine hydrobromide, L-arginine, D-arginine, DL-arginine, L-arginine hydrochloride, D-arginine hydrochloride, DL-arginine hydrochloride, L-arginine hydrobromide, D-arginine hydrobromide, DL-arginine hydrobromide, L-ornithine, D-ornithine, DL-ornithine, L-ornithine hydrochloride, D-ornithine hydrochloride, DL-ornithine hydrochloride, L-ornithine hydrobromide, D-ornithine hydrobromide, and DL-ornithine hydrobromide.

The palladium complex (I) can be prepared such that a palladium salt and 2 or more equivalents of the basic amino acid are added to water at about 20° C. to 100° C., the pH is adjusted to about 4.0 to 8, and the components are stirred and mixed.

The palladium complex (I) solution prepared in the above manner may be purified by a known method to obtain a purified material, and may be concentrated and freeze-dried to obtain a powder, if necessary.

The processing solution for catalyst application of the invention may be prepared by controlling the concentration of the palladium complex (I) solution prepared in the above manner, or by dissolving or diluting the purified material or the powder into a desired concentration using water.

The concentration of the palladium complex (I) in the processing solution for catalyst application is such that the equivalent metallic palladium concentration is within the range of 0.5 mg/L to its saturated concentration, preferably 1 to 1,000 mg/L. The pH of the solution is preferably within the range of 3 to 9, particularly preferably within the range of 4 to 8, though the preferred pH depends on the type of the basic amino acid used.

The processing solution for catalyst application of the invention can be efficiently used for forming a metal plated film on a nonconductive resin. More specifically, the palladium complex can be selectively adsorbed to the nonconductive resin in the manner that the nonconductive resin is degreased by a common method, anionic groups such as carboxyl groups are formed on the surface of the nonconductive resin, and the nonconductive resin is soaked in the processing solution for catalyst application of the invention, to selectively adsorb the palladium complex only to portions having the anionic groups. Then, a metal plated film can be selectively formed such that the palladium complex is reduced by a reducing agent into metallic palladium used as an electroless plating catalyst, and subjected to electroless plating and electroplating.

The method for selectively forming the metal film on the nonconductive resin of a polyimide resin by using the processing solution for catalyst application of the invention will be specifically described below.

First anionic groups of carboxyl groups are formed on the polyimide resin surface. The polyimide resin is subjected to an alkali treatment to form the carboxyl groups. In the alkali treatment, an aqueous solution of an alkaline substance such as lithium hydroxide, sodium hydroxide, or potassium hydroxide is used. In this case, the alkali treatment is achieved by soaking the polyimide resin in an alkaline substance solution having a concentration of about 0.01 to 10 mol/L at about 20° C. to 100° C. for about 10 seconds to 30 minutes. As a result, imide rings of the polyimide resin are opened by alkali hydrolysis to generate polyamic acid ions, whereby the carboxyl groups are formed.

Then, the polyimide resin having the surface carboxyl groups (the polyamic acid) is soaked in the processing solution for catalyst application of the invention. The process of soaking in the processing solution for catalyst application is carried out at about 20° C. to 100° C. for about 1 second to 60 minutes. In this process, the free cationic group (the amino group or the guanidyl group) of the palladium complex (I) interacts with the anionic carboxyl group on the polyimide resin surface, whereby a large amount of the palladium complex can be selectively adsorbed to the polyimide resin.

The polyimide resin, to which the palladium complex (I) is adsorbed in this manner, is subjected to a reduction treatment, so that the palladium ion in the palladium complex is reduced into metallic palladium. The method for the reduction is not limited as long as it can reduce the palladium ion, and may be a known method such as a reduction method using hydrogen gas, or a reduction method of soaking in an aqueous solution of dimethylamine borane, sodium borohydride, etc.

Finally the polyimide resin is soaked in an electroless plating bath, whereby a metal layer is deposited by using the metallic palladium attached to the resin surface as a core. Then, an electroplating process is carried out using this metal layer as a conductive layer, whereby a metal film can be selectively formed.

By using the processing solution for catalyst application of the invention, there can be provided a novel process for plating on a widely used ABS resin, etc.

Conventionally, in the case of forming an electroless plating layer on a surface of a nonconductive resin such as a plastic, it has been necessary to carry out a catalyst adsorbing treatment, which contains attaching a catalyst metal such as palladium, platinum, silver, nickel, or copper, etc. onto the surface. Further, an etching treatment is carried out before the catalyst adsorbing treatment such that the catalyst metal can be supported on the nonconductive substrate surface. In the etching treatment, the nonconductive substance surface is roughened to form macro roughness and pore. The catalyst metal is fixed to inside of the roughness and pore, an electroless plated film is deposited on the inside of the pore using the catalyst metal as a core, and an electroplated film is then deposited thereon, to achieve strong adhesion (an anchor effect) between the nonconductive substance surface and the plated film.

Further, conventionally, products obtained by forming metal plated films on formed resins such as ABS (acrylonitrile-butadiene-styrene) resins and PC/ABS (polycarbonate/acrylonitrile-butadiene-styrene) resins have been widely used in the fields of automobile manufacturing, sanitary equipment members such as water washing metal members, etc. Chromic acid/sulfuric acid mixture liquids have generally been used for etching surfaces of the ABS resins and PC/ABS resins (hereinafter both referred to generically as "the ABS resins").

However, there have recently been demands for plating processes not using the chromic acid because the chromic acid contains a hexavalent chromium harmful to human and environment. And novel pretreatment processes for plating, which utilize hydrophilization processes and polyamino compounds without the chromic acid, have been proposed.

And yet at the same time, in the case of using the pretreatment processes for plating, an electroplated film is disadvantageously deposited not only on the formed resin but also on an insulating coating (e.g. a coating of a flexible vinyl chloride sol) of a plating jig for fixing the resin. This is caused because a catalyst metal is adsorbed onto the plating jig and an electroless plating layer is deposited thereon. Conventionally, to solve the problem, after the formed resin is made conductive by the electroless plating process, the plating jig used is replaced with another plating jig having no plating layers on the insulating coating before the electroplating process. This method is remarkably complicated and poor in working efficiency.

In contrast, by forming a carboxyl group on a surface of the ABS resin and by using the processing solution for catalyst application of the invention, the metal film can be formed on the ABS resin without use of the chromic acid and replacement of the jigs.

A specific example of the method for forming the metal film on the nonconductive resin of the ABS resin by using the processing solution for catalyst application of the invention will be described below.

First, an ABS resin is subjected to an oxidation treatment to form carboxyl groups on its surface. The oxidation treatment is carried out using a mixture liquid containing about 0.01 to 0.5 mol/L of a permanganate salt such as potassium permanganate or sodium permanganate, and about 300 to 900 mL/L of an acid such as sulfuric acid, phosphoric acid, or nitric acid. The oxidation treatment is carried out at a relatively low temperature of 0° C. to 50° C. for about 1 to 60 minutes in this case. The generation of the carboxyl groups in this treatment can be confirmed by observing absorption around $1625$ cm$^{-1}$ specific to the carboxyl groups in Fourier transform infrared spectrometry. It should be noted that the liquid for the oxidation treatment does not form carboxyl groups on an insulating coating (e.g. a coating of a flexible vinyl chloride sol or a fluororesin) of a plating jig.

Then, the ABS resin having the surface carboxyl groups is soaked in the processing solution for catalyst application of the invention. The soaking treatment with the processing solution for catalyst application is carried out at a temperature of about 20° C. to 100° C. for 1 second to 60 minutes. In this treatment, the free cationic group (the amino group or the guanidyl group) in the palladium complex (I) interacts with the anionic group of the carboxyl group on the ABS resin surface, so that a large amount of the Pd complex can be selectively adsorbed onto the resin. Further, the palladium complex (I) is not absorbed to an insulating coating surface of a plating jig because there are few carboxyl groups on the surface.

The ABS resin, to which the palladium complex (I) is adsorbed in this manner, is then subjected to a reduction treatment, whereby the palladium ion in the palladium complex is reduced into metallic palladium. The method for the reduction treatment is not limited as long as it can reduce the palladium ion, and may be a known method such as a reduction method using hydrogen gas, or a reduction method of soaking in an aqueous solution of dimethylamine borane, sodium borohydride, etc.

Finally the ABS resin is soaked in an electroless plating bath, whereby a metal layer is deposited by using the metallic palladium attached to the resin surface as a core. Then, an electroplating process is carried out using this metal layer as a conductive layer, whereby a plated film can be deposited selectively only on the ABS resin.

EXAMPLES

The present invention will be described in more detail below with reference to Examples and Comparative Examples, without intention of restricting the invention to these examples.

Example 1

Synthesis of Palladium Complex (I)

(1) Palladium-bislysinate complex [Pd(Lys)$_2$]$^{2+}$:

0.21 g of palladium chloride (special grade, available from Toyo Chemical Industrial Co., Ltd.) and 0.52 g of L-lysine hydrochloride salt (special grade, available from Wako Pure Chemical Industries, Ltd.) were added to 500 mL of pure water, the pH was adjusted to 6.0 by potassium hydroxide (special grade, available from Wako Pure Chemical Industries, Ltd.), and the mixture was stirred at 70° C. for 1 hour to obtain a processing solution for catalyst application having an equivalent metallic palladium concentration of 250 mg/L.

(2) Palladium-bisarginate complex [Pd(Arg)$_2$]$^{2+}$:

0.21 g of palladium chloride (special grade, available from Toyo Chemical Industrial Co., Ltd.) and 0.59 g of L-arginine hydrochloride salt (special grade, available from Wako Pure Chemical Industries, Ltd.) were added to 500 mL of pure water, the pH was adjusted to 6.0 by potassium hydroxide (special grade, available from Wako Pure Chemical Industries, Ltd.), and the mixture was stirred at 70° C. for 1 hour to obtain a processing solution for catalyst application having an equivalent metallic palladium concentration of 250 mg/L.

Comparative Example 1

Synthesis of Comparative Palladium Complex

For comparison, nonbasic palladium complexes were synthesized in the same manner as Example 1. The synthesized palladium-amino acid complexes are a palladium-bisalaninate complex [Pd(Ala)$_2$] having no free functional groups, a palladium-bisserinate complex [Pd(Ser)$_2$] having a hydroxyl group, a palladium-bisglutamate complex [Pd(Glu)$_2$]$^{2-}$ having an anionic carboxyl group, and a widely known hydrochloric acid solution of palladium chloride (palladium-tetrachloride complex) [PdCl$_4$]$^{2-}$.

(1) Palladium-bisalaninate complex [Pd(Ala)$_2$]:

0.21 g of palladium chloride (special grade, available from Toyo Chemical Industrial Co., Ltd.) and 0.25 g of L-alanine (special grade, available from Wako Pure Chemical Industries, Ltd.) were added to 500 mL of pure water, the pH was adjusted to 6.0 by potassium hydroxide (special grade, available from Wako Pure Chemical Industries, Ltd.), and the mixture was stirred at 70° C. for 1 hour to obtain a processing solution for catalyst application having an equivalent metallic palladium concentration of 250 mg/L.

(2) Palladium-bisserinate complex [Pd(Ser)$_2$]:

0.21 g of palladium chloride (special grade, available from Toyo Chemical Industrial Co., Ltd.) and 0.30 g of L-serine (special grade, available from Wako Pure Chemical Industries, Ltd.) were added to 500 mL of pure water, the pH was adjusted to 6.0 by potassium hydroxide (special grade, available from Wako Pure Chemical Industries, Ltd.), and the mixture was stirred at 70° C. for 1 hour to obtain a processing solution for catalyst application having an equivalent metallic palladium concentration of 250 mg/L.

(3) Palladium-bisglutamate complex [Pd(Glu)$_2$]$^{2-}$:

0.21 g of palladium chloride (special grade, available from Toyo Chemical Industrial Co., Ltd.) and 0.53 g of sodium L-glutamate monohydrate (special grade, available from Wako Pure Chemical Industries, Ltd.) were added to 500 mL of pure water, the pH was adjusted to 6.0 by potassium hydroxide (special grade, available from Wako Pure Chemical Industries, Ltd.), and the mixture was stirred at 70° C. for 1 hour to obtain a processing solution for catalyst application having an equivalent metallic palladium concentration of 250 mg/L.

(4) Hydrochloric acid solution of palladium chloride (palladium-tetrachloride complex) [PdCl$_4$]$^{2-}$:

0.21 g of palladium chloride (special grade, available from Toyo Chemical Industrial Co., Ltd.) and 8.33 g of 37% hydrochloric acid (special grade, available from Wako Pure Chemical Industries, Ltd.) were added to 500 mL of pure water, and the mixture was stirred at 70° C. for 30 minutes until the palladium chloride was completely dissolved. Then, the pH of the mixture was adjusted to 6.0 by potassium hydroxide (special grade, available from Wako Pure Chemical Industries, Ltd.) to obtain a processing solution for catalyst application having an equivalent metallic palladium concentration of 250 mg/L.

Example 2

Structure of Palladium-Amino Acid Complex

It is widely known that [Pd(Ala)$_2$] has such a planar tetracoordination structure that the amino groups and carboxyl groups are coordinated to form 5-membered chelate rings as follows.

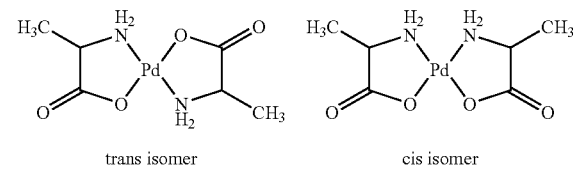

trans isomer      cis isomer

The 3 palladium-amino acid complexes of [Pd(Lys)$_2$]$^{2+}$, [Pd(Ser)$_2$], and [Pd(Glu)$_2$]$^{2-}$ have amino groups, hydroxyl groups, and carboxyl groups in side chains of the amino acid ligands respectively. It was thought that the functional groups in the side chains could be coordinated to palladium, so that the palladium complexes were subjected to ultraviolet-visible absorption spectrum measurement to confirm whether the functional groups are coordinated to palladium or in the free states. In the ultraviolet-visible absorption spectrum measurement, UV-2500PC (manufactured by Shimadzu Corporation) was used under conditions of a cell length of 1 cm and a temperature of 25° C. The results of the measurement are shown in FIG. 1.

As a result, all the palladium-amino acid complexes had the same spectrum patterns, and thus it was confirmed that these complexes had coordination structures equal to the widely known structure of [Pd(Ala)$_2$], which is such the planar tetracoordination structure that the amino groups and carboxyl groups are coordinated to form the 5-membered chelate rings. Thus, it can be determined that, in the 3 palladium-amino acid complexes of [Pd(Lys)$_2$]$^{2+}$, [Pd(Ser)$_2$], and [Pd(Glu)$_2$]$^{2-}$, the functional groups, the amino groups, hydroxyl groups, and carboxyl groups, in the amino acid side chains are not coordinated to palladium and are in the free states.

Example 3

Adsorption of Palladium Complex (I) to Carboxyl Group

Using the nonbasic palladium-amino acid complexes synthesized in Comparative Example 1, the amounts of the palladium complexes adsorbed to resin surfaces and the electroless plating deposition properties of the complexes were measured, and thereby whether the free cationic groups of the amino group and the guanidyl group in the palladium complex (I) interact with carboxyl groups on resin surfaces or not was evaluated.

A polyimide resin (KAPTON 100-EN available from Du Pont-Toray Co., Ltd.) was modified to have carboxyl groups and treated with each palladium-amino acid complex by the following processes. The electroless nickel plating deposition property of the resultant and the amount of adsorbed palladium after the reduction treatment were measured by Shimadzu sequential plasma emission spectrometer (manufactured by Shimadzu Corporation). The operation processes are shown below and the measurement results are shown in Table 1.

[Operation Processes]
Degreasing treatment: PB-120*[1], 50° C., 10 minutes
Alkali treatment: 5-mol/L aqueous potassium hydroxide solution*[2], 50° C., 2 minutes
Catalyst adsorbing treatment: each palladium-amino acid complex, 50° C., 5 minutes, pH 6.0
Reduction treatment: PC-66H*[1], 35° C., 5 minutes
Electroless nickel plating: ENILEX NI-5*[1], 35° C., 5 minutes, pH 8.8
*[1]: Available from Ebara-Udylite Co., Ltd.
*[2]: Prepared by using special-grade potassium hydroxide available from Wako Pure Chemical Industries, Ltd.
Water washing was carried out between each process.

TABLE 1

| | Free functional group | Amount of adsorbed palladium (mg/dm$^2$) | Deposition property |
|---|---|---|---|
| [Pd(Lys)$_2$]$^{2+}$ | Amino group | 0.357 | Deposited |
| [Pd(Arg)$_2$]$^{2+}$ | Guanidyl group | 0.219 | Deposited |
| [Pd(Ala)$_2$] | Methyl group | 0.005 | Deposited slightly in part |
| [Pd(Ser)$_2$] | Hydroxyl group | 0.005 | Deposited slightly in part |
| [Pd(Glu)$_2$]$^{2-}$ | Carboxyl group | Below detection limit | Not deposited at all |

As is clear from the results, the [Pd(Lys)$_2$]$^{2+}$ and [Pd(Arg)$_2$]$^{2+}$, which have a free cationic functional group of an amino or guanidyl group, show remarkably high adsorption to the anionic functional group of the carboxyl group on the resin surface.

Example 4

(1) Polar group selectivity of palladium complex (I):
It is known that a hydroxyl group, a carbonyl group, or a carboxyl group is generated by oxidation-treating a resin surface. To confirm whether the palladium complex (I) is selectively adsorbed only to the carboxyl group or not, Sample A having hydroxyl groups and carbonyl groups on the surface, Sample B having hydroxyl groups, carbonyl groups, and carboxyl groups, and Sample C having hydroxyl groups and carboxyl groups were prepared and the palladium adsorption amounts thereof were compared.

(2) Preparation of Sample A having hydroxyl groups and carbonyl groups on surface:
An ABS sheet having a size of 5 cm×9 cm (available from UMG ABS, Ltd.) was irradiated in the air for 20 minutes with ultraviolet rays (184.9 nm, 253.7 nm) by using a light surface treatment apparatus (manufactured by Senengineering Co., Ltd.) at a 5-cm distance between the ultraviolet ray lamp and the ABS sheet.

The surface functional groups of the ABS sheet were analyzed under vacuum by a single reflection ATR method using a Fourier transform infrared spectrophotometer FT/IR6100FV (manufactured by Jasco Corporation). As a result, the absorption specific to hydroxyl groups was observed around 3340 cm$^{-1}$, and the absorption specific to carbonyl groups was observed around 1715 cm$^{-1}$. The measured FT-IR spectrum is shown in FIG. 2, and the difference spectrum between the sample and the untreated ABS sheet is shown in FIG. 3.

(3) Preparation of Sample B having hydroxyl groups, carbonyl groups, and carboxyl groups on surface:
An ABS sheet having a size of 5 cm×9 cm (available from UMG ABS, Ltd.) was soaked at 70° C. for 60 minutes in an aqueous solution containing 40 g/L of potassium permanganate (special grade, available from Wako Pure Chemical Industries, Ltd.) and 100 mL/L of 85% phosphoric acid (special grade, available from Wako Pure Chemical Industries, Ltd.) to have a carbonyl group content equal to that of Sample A.

The surface functional groups of the ABS sheet were analyzed under vacuum by a single reflection ATR method using a Fourier transform infrared spectrophotometer FT/IR6100FV (manufactured by Jasco Corporation). As a result, the absorption specific to hydroxyl groups was observed around 3340 cm$^{-1}$, the absorption specific to carbonyl groups was observed around 1715 cm$^{-1}$, and the absorption specific to carboxyl groups was observed around 1625 cm$^{-1}$. The measured FT-IR spectrum is shown in FIG. 2, and the difference spectrum between the sample and the untreated ABS sheet is shown in FIG. 3.

(4) Preparation of Sample C having hydroxyl groups and carboxyl groups on surface:
An ABS sheet having a size of 5 cm×9 cm (available from UMG ABS, Ltd.) was soaked at 30° C. for 10 minutes in an aqueous solution containing 2 g/L of potassium permanganate (special grade, available from Wako Pure Chemical Industries, Ltd.) and 700 mL/L of phosphoric acid (special grade, available from Wako Pure Chemical Industries, Ltd.) to have a hydroxyl group content equal to that of Sample A.

The surface functional groups of the ABS sheet were analyzed under vacuum by a single reflection ATR method using a Fourier transform infrared spectrophotometer FT/IR6100FV (manufactured by Jasco Corporation). As a result, the absorption specific to hydroxyl groups was observed around 3340 cm$^{-1}$, and the absorption specific to carboxyl groups was observed around 1625 cm$^{-1}$. The measured FT-IR spectrum is shown in FIG. 2, and the difference spectrum between the sample and the untreated ABS sheet is shown in FIG. 3.

(5) The amount of palladium adsorbed to each of the prepared 3 ABS sheets after the reduction treatment was measured by Shimadzu sequential plasma emission spectrometer (manufactured by Shimadzu Corporation). The operation processes are shown below and the measurement results are shown in Table 2.

[Operation Processes]

Catalyst adsorbing treatment: $[Pd(Lys)_2]^{2+}$, 5° C., 5 minutes, pH 6.0

Reduction treatment: PC-66H*[3], 35° C., 5 minutes

*[3]: Available from Ebara-Udylite Co., Ltd.

Water washing was carried out between each process.

TABLE 2

| | Amount of adsorbed palladium (mg/dm$^2$) |
|---|---|
| Sample A | 0.030 |
| Sample B | 0.368 |
| Sample C | 0.063 |

When Samples A and B are compared with respect to the difference spectra (FIG. 3), Sample B has more hydroxyl groups and has carboxyl groups as main functional groups, while Sample A has less hydroxyl groups and has carbonyl groups as main functional groups. Further, Sample B shows an adsorbed palladium amount 10 or more times larger than that of Sample A.

When Samples A and C are compared, Sample C has no carbonyl groups and less carboxyl groups though it has a hydroxyl content equal to that of Sample A. Further, Sample C shows an adsorbed palladium amount 2 or more times larger than that of Sample A.

Thus, the palladium adsorption amounts and the carboxyl contents at 1625 cm$^{-1}$ in the FT-IR spectra of FIG. 2 and the difference spectra of FIG. 3 are increased in the order of Sample A, Sample C, and Sample B, and it is clear from the results that $[Pd(Lys)_2]^{2+}$ was selectively adsorbed to carboxyl groups. Further, Sample A has more carbonyl groups at 1715 cm$^{-1}$ and has the smallest amount of adsorbed $[Pd(Lys)_2]^{2+}$, and thus it is confirmed that the carbonyl groups did not concern the $[Pd(Lys)_2]^{2+}$ adsorption.

Example 5

Confirmation of Electroless Plating Selectivity

A polyimide resin (KAPTON 100-EN available from Du Pont-Toray Co., Ltd.) was degreased with PB-120 (available from Ebara-Udylite Co., Ltd.), and only the lower half of the polyimide resin was alkali-treated such that the lower half was soaked in a 5-mol/L aqueous solution of potassium hydroxide (special grade, available from Wako Pure Chemical Industries, Ltd.) at 50° C. for 2 minutes. The resultant resin was soaked in the processing solution for catalyst application containing $[Pd(Lys)_2]^{2+}$ at 50° C. for 5 minutes, and was further soaked in a reduction treatment solution PC-66H (available from Ebara-Udylite Co., Ltd.) at 35° C. for 5 minutes. Then, the resultant resin was subjected to plating using an electroless nickel plating liquid ENILEX NI-5 (available from Ebara-Udylite Co., Ltd.) at 35° C. for 5 minutes under a pH of 8.8. Water washing was carried out between each process.

The appearance of the resultant resin was observed after the electroless nickel plating. As a result, nickel was deposited only on the lower half of the polyimide resin, which was alkali-treated, and thus it is clear that the metal film can be selectively deposited depending on the alkali treatment.

Comparative Example 2

A plating process was carried out in the same manner as Example 5 except for using the common hydrochloric acid solution of palladium chloride $[PdCl_4]^{2-}$ synthesized in Comparative Example 1 instead of $[Pd(Lys)_2]^{2+}$ in the processing solution for catalyst application.

The appearance of the resultant resin was observed after the electroless nickel plating. As a result, nickel was deposited not only on the alkali-treated lower half of the polyimide resin but also on the upper half not alkali-treated, thereby failing to selectively deposit the metal film.

Comparative Example 3

A plating process was carried out in the same manner as Example 5 except for using a processing solution for catalyst application PC-65H (available from Ebara-Udylite Co., Ltd.) instead of the liquid containing $[Pd(Lys)_2]^{2+}$.

The appearance of the resultant resin was observed after the electroless nickel plating. As a result, nickel was deposited not only on the alkali-treated lower half of the polyimide resin but also on the upper half not alkali-treated, thereby failing to selectively deposit the metal film.

Example 6

Plating on Various Resins

An ABS sheet having a size of 5 cm×9 cm (available from UMG ABS, Ltd.) was soaked at 30° C. for 10 minutes in an aqueous solution containing 2 g/L of potassium permanganate (special grade, available from Wako Pure Chemical Industries, Ltd.) and 700 mL/L of phosphoric acid (special grade, available from Wako Pure Chemical Industries, Ltd.), to generate carboxyl groups on the ABS sheet surface. The ABS sheet was water-washed and soaked in the $[Pd(Lys)_2]^{2+}$ liquid prepared in Example 1 at 50° C. for 5 minutes to adsorb the palladium complex onto the ABS sheet surface. Then, the resulting ABS sheet was soaked in a reduction solution PC-66H (available from Ebara-Udylite Co., Ltd.) at 35° C. for 5 minutes to reduce the palladium complex into metallic palladium.

The ABS sheet was soaked for 10 minutes in an electroless nickel plating liquid ENILEX NI-5 (available from Ebara-Udylite Co., Ltd.) having a pH of 8.8 and a temperature of 35° C., to deposit a 0.5-μm nickel-phosphorus film. In this step, the nickel-phosphorus film was not deposited on plating jigs. The resultant sheet was subjected to nickel strike plating at 45° C. for 3 minutes in a Watts bath under 2A/dm$^2$, and the nickel surface was replaced by copper using PDC (available from Ebara-Udylite Co., Ltd.). The sheet was plated with a copper sulfate plating EP-30 (available from Ebara-Udylite Co., Ltd.) at 25° C. and 3 A/dm$^2$ for 40 minutes to deposit a 20-μm copper film. Then, the sheet was annealed at 80° C. for 1 hour. Water washing was carried out between each process.

The adhesive strength between the obtained plated film and the resin was measured in accordance with JIS H8630 Appendix 6. First 2 grooves were formed on the sheet by a cutter, and then the copper film with a 10-mm width was peeled off and the adhesive strength was measured using a tensile strength tester AGS-H500N (manufactured by Shimadzu Corporation). As a result, the adhesive strength was 1.4 kgf/cm, remarkably high and sufficient for practical use.

Example 7

Processes were carried out in the same manner as Example 6 except for using a PC/ABS sheet having a size of 5 cm×9 cm (available from UMG ABS, Ltd., containing 65% PC) as a resin material. The adhesive strength was 1.0 kgf/cm, remarkably high and sufficient for practical use.

Example 8

A polyimide resin KAPTON 100-EN having a size of 5 cm×9 cm (available from Du Pont-Toray Co., Ltd.) was degreased with PB-120 (available from Ebara-Udylite Co., Ltd.), and alkali-treated by soaking the resin at 50° C. for 5 minutes in a 0.5-mol/L aqueous solution of potassium hydroxide (special grade, available from Wako Pure Chemical Industries, Ltd.). The resin was soaked in the $[Pd(Lys)_2]^{2+}$ processing solution for catalyst application at 50° C. for 5 minutes, and further soaked in a reduction treatment solution PC-66H (available from Ebara-Udylite Co., Ltd.) at 35° C. for 5 minutes.

Then, the resultant resin was subjected to plating using an electroless nickel plating liquid ENILEX NI-5 (available from Ebara-Udylite Co., Ltd.) at 35° C. for 5 minutes under a pH of 8.8, to deposit a 0.2-μm nickel-phosphorus film. The resin was annealed at 80° C. for 1 hour, and the nickel surface was replaced by copper using PDC (available from Ebara-Udylite Co., Ltd.). Finally the resin was plated with a copper sulfate plating bath CU-BRITE 21 (available from Ebara-Udylite Co., Ltd.) at 25° C. and 2 A/dm² for 1 hour to deposit a 20-μm copper film. Then, the resin was annealed at 80° C. for 1 hour and at 120° C. for 1 hour. Water washing was carried out between each process.

The adhesive strength between the obtained plated film and the resin was measured in accordance with JISC-6481. First 2 grooves were formed on the resin by a cutter, and then the copper film with a 10-mm width was peeled off and the adhesive strength was measured using a tensile strength tester AGS-H500N (manufactured by Shimadzu Corporation). As a result, the adhesive strength was 1.1 kgf/cm, remarkably high and sufficient for practical use.

Example 9

Plating was carried out in the same manner as Example 7 except that only one side of the sheet was treated at 35° C. for 15 minutes using an electroless copper plating PB-506 (available from Ebara-Udylite Co., Ltd.) instead of the electroless nickel plating.

As a result, the adhesive strength was 1.1 kgf/cm, remarkably high and sufficient for practical use.

Example 10

Plating was carried out in the same manner as Example 7 except for using a $[Pd(Arg_2)]^{2+}$ processing solution for catalyst application instead of the $[Pd(Lys)_2]^{2+}$ processing solution for catalyst application of Example 8.

As a result, the adhesive strength was 1.0 kgf/cm, remarkably high and sufficient for practical use.

INDUSTRIAL APPLICABILITY

The palladium complex of the present invention is composed of a palladium ion and a basic amino acid. A basic group in the free side chain of the basic amino acid is not coordinated to the palladium ion and can interact with an anionic group such as a carboxyl group on a nonconductive resin surface, whereby the palladium complex can be adsorbed selectively only onto the anionic group portion.

As a result, a metal film can be selectively deposited only on an alkali-treated portion of a polyimide resin, etc., so that the palladium complex can be preferably used for forming a circuit by a full additive method in the electronics field.

Further, in the decoration field, there can be provided a novel, very economical, highly workable plating treatment process, which does not require use of a harmful hexavalent chromium and replacement of plating jigs.

The invention claimed is:

1. A method comprising:
  treating a nonconductive resin comprising a surface anionic group in a catalyst adsorbing treatment, then
  treating the nonconductive resin in a reduction treatment,
  electroless metal plating, over the nonconductive resin, after the reduction treatment and
  metal electroplating over the electroless metal plating that is over the nonconductive resin,
  to form a metal plated film on a surface of said nonconductive resin,
  wherein the catalyst adsorbing treatment comprises treating with a processing solution comprising a palladium complex of formula (I):

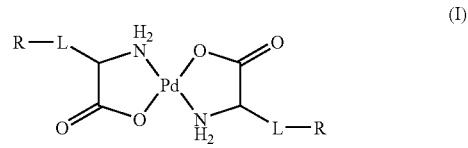

wherein L is an alkylene group and R is an amino group or a guanidyl group, or a structural isomer thereof.

2. The method of claim 1, wherein L is an alkylene group having 4 carbon atoms and R is an amino group.

3. The method of claim 1, wherein L is an alkylene group having 3 carbon atoms and R is an amino group.

4. The method of claim 1, wherein L is an alkylene group having 3 carbon atoms and R is a guanidyl group.

5. The method of claim 1, wherein the surface anionic group is a carboxyl group.

6. The method of claim 5, wherein the nonconductive resin is a polyimide resin comprising a carboxyl group obtained by an alkali treatment.

7. The method of claim 5,
  wherein the nonconductive resin is an acrylonitrile-butadiene-styrene resin or a polycarbonate/acrylonitrile-butadiene-styrene resin comprising a carboxyl group obtained by an oxidation treatment with a mixture liquid comprising a permanganate salt and an acid.

8. The method of claim 5, wherein the processing solution has a temperature of from 20° C. to 100° C.

9. The method of claim 1, wherein a duration of the catalyst adsorbing treatment is from 1 second to 60 minutes.

10. The method of claim 1, wherein the processing solution has a temperature of from 20° C. to 100° C. during the catalyst adsorbing treatment.

11. The method of claim 10, wherein a duration of the catalyst adsorbing treatment is from 1 second to 60 minutes.

12. The method of claim 10, wherein the nonconductive resin is a polyimide resin comprising a carboxyl group obtained by an alkali treatment.

13. The method of claim 1, wherein a concentration of the palladium complex in the processing solution is such that an equivalent metallic palladium concentration is from 1 to 1,000 mg/L.

14. The method of claim 1, wherein a pH of the processing solution is from 3 to 9.

15. The method of claim 1, wherein a pH of the processing solution is from 4 to 8.

16. The method of claim 1, wherein the resin of the non-conductive resin is selected from the group consisting of an acrylonitrile-butadiene-styrene resin and a polycarbonate/acrylonitrile-butadiene-styrene resin.

* * * * *